(12) United States Patent
Paradise

(10) Patent No.: US 9,207,108 B2
(45) Date of Patent: Dec. 8, 2015

(54) FLUID MASS FLOW MEASUREMENT APPARATUS AND METHOD

(75) Inventor: Bruce Paradise, Avon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 845 days.

(21) Appl. No.: 13/358,969

(22) Filed: Jan. 26, 2012

(65) Prior Publication Data

US 2013/0197828 A1 Aug. 1, 2013

(51) Int. Cl.
*G01F 1/90* (2006.01)

(52) U.S. Cl.
CPC .......................................... *G01F 1/90* (2013.01)

(58) Field of Classification Search
CPC ........................................................ G01F 1/90
USPC .............................................................. 702/45
See application file for complete search history.

(56) References Cited

U.S. PATENT DOCUMENTS

| | | | | |
|---|---|---|---|---|
| 3,739,635 A | * | 6/1973 | Stuart | .............................. 73/198 |
| 4,016,759 A | * | 4/1977 | Baker et al. | ................ 73/204.12 |
| 4,689,989 A | * | 9/1987 | Aslesen | ..................... G01F 1/86 73/61.44 |
| 5,115,635 A | | 5/1992 | Jennings et al. | |
| 5,359,878 A | | 11/1994 | Mudd | |
| 5,447,023 A | | 9/1995 | Meisner et al. | |
| 5,827,963 A | | 10/1998 | Selegatto et al. | |
| 5,911,238 A | | 6/1999 | Bump et al. | |
| 5,913,250 A | | 6/1999 | Wible | |
| 5,975,126 A | | 11/1999 | Bump et al. | |
| 6,148,601 A | | 11/2000 | Jones et al. | |
| 6,692,535 B2 | | 2/2004 | Olivier | |
| 7,607,362 B1 | * | 10/2009 | Brost | ........................ G01F 1/06 73/202 |
| 2007/0151333 A1 | | 7/2007 | Paradise | |
| 2010/0280757 A1 | * | 11/2010 | Agar et al. | ...................... 702/12 |
| 2011/0307192 A1 | | 12/2011 | Veilleux | |

FOREIGN PATENT DOCUMENTS

| | | |
|---|---|---|
| EP | 0608736 A2 | 8/1994 |
| JP | S5847216 A | 3/1983 |

OTHER PUBLICATIONS

The GB Search Report mailed Jul. 22, 2013 for Great Britain Application No. GB1301342.0.

* cited by examiner

*Primary Examiner* — Regis Betsch
(74) *Attorney, Agent, or Firm* — Kinney & Lange, P.A.

(57) ABSTRACT

A meter controller comprises a first input, a second input, and a processor. The processor is configured to receive first and second volumetric flow measurements and to calculate a quasi fluid density value required to cause the first volumetric flow measurement to equal the second volumetric flow measurement. The processor is further configured to subtract a first fluid density value from the quasi fluid density value for calculating a density correction factor. The density correction factor is subtracted from the first fluid density value to calculate a corrected second density value. The corrected second density value is applied to at least one of the first volumetric flow measurement and the second volumetric flow measurement for calculating a mass flow rate measurement.

16 Claims, 6 Drawing Sheets

FLUID MASS FLOW MEASUREMENT APPARATUS AND METHOD

BACKGROUND

This application relates generally to systems and methods for measuring fluid flow through a pipe, and more particularly to systems and methods for providing highly accurate real-time mass flow measurements.

In the context of aircraft, an accurate mass flow of fuel must be determined in order to determine how much fuel remains in reserve throughout flight. Torque/angle mass flow meters have been used on aircraft since the 1950's, but have limited turn down ratios (flow ranges) and exhibit very poor accuracy except over certain temperature and flow bands. Robust and highly accurate volumetric turbine flow meters have been available, but these are not true mass flow meters. These military standard turbine flow meters, having excellent turn down ratios (min/max flow) and dual bearing systems are made by companies such as Quantum Dynamics of Woodland Hills, Calif. In addition to military aircraft, Quantum Dynamics' flow meters have been used on lunar excursion modules and have some limited use on certain commercial aircraft. High accuracy coriolis meters have also been implemented for measuring flow rates in ground-based applications. However these meters are expensive, complex, and have other shortcomings such as sensitivity to vibration and g-forces, making them unsuitable for aircraft use.

While turbine flow meters have very good volumetric flow capabilities, they rely on nominal fluid density or predefined estimates tuned for certain operating conditions. This causes significant deviation from the actual fluid mass flow if there is substantial variation in the fluid characteristics. As there is a level of acceptable variation in the composition of many process fluids such as Jet/A1 fuel, the density of the fluid can vary, affecting mass flow measurements. Since Jet/A1 varies from one region to another, depending on where the crude is sourced and/or where it is refined, Jet/A1 from multiple sources with multiple densities can be mixed in processing, transport or in aircraft fuel tanks both prior to and during flight. Therefore the actual density of the fuel entering the engine at any given moment cannot be predicted, and using a nominal value of Jet/A1 density will nearly always yield substantial mass flow error even using otherwise highly accurate volumetric flow meters.

SUMMARY

A meter controller comprises a first input, a second input, and a processor. The first input is configured to receive a first volumetric flow measurement. The second input is configured to receive a second volumetric flow measurement derived from a different source than the first volumetric flow measurement. The processor is configured to receive the first and second volumetric flow measurements and to calculate a quasi fluid density value required to cause the first volumetric flow measurement to equal the second volumetric flow measurement. The processor is further configured to subtract a first fluid density value from the quasi fluid density value for calculating a density correction factor. The density correction factor is subtracted from the first fluid density value to calculate a corrected second density value. The corrected second density value is applied to at least one of the first volumetric flow measurement and the second volumetric flow measurement for calculating a mass flow rate measurement.

A fluid mass flow meter comprises a first volumetric flow meter, a second volumetric flow meter proximate the first volumetric flow meter, and a meter controller. The meter controller is in communication with the first and second volumetric flow meters and has at least one processor. The processor is configured to receive a first volumetric flow rate measurement from the first volumetric flow meter and a second volumetric flow rate measurement from the second volumetric flow meter. The at least one processor is further configured to calculate a quasi fluid density value required to cause the first volumetric flow measurement to equal the second volumetric flow measurement. The first fluid density value is subtracted from the quasi fluid density value to calculate a density correction factor. The density correction factor is then subtracted from the first fluid density value to calculate a corrected second density value. The corrected second density value is applied to at least one of the first volumetric flow measurement and the second flow measurement for calculating a mass flow.

A method of measuring a flow rate of a fluid, the method comprises measuring a first volumetric flow rate using at least one first flow meter. A second volumetric flow rate is measured using at least second one flow meter. A quasi density value is calculated by adjusting a first fluid density such that the first volumetric flow rate equals the second volumetric flow rate. A density correction factor is calculated by subtracting the first fluid density from the quasi density value. A corrected density value is calculated by subtracting the density correction factor from the first fluid density.

DETAILED DESCRIPTION

Figure 1:
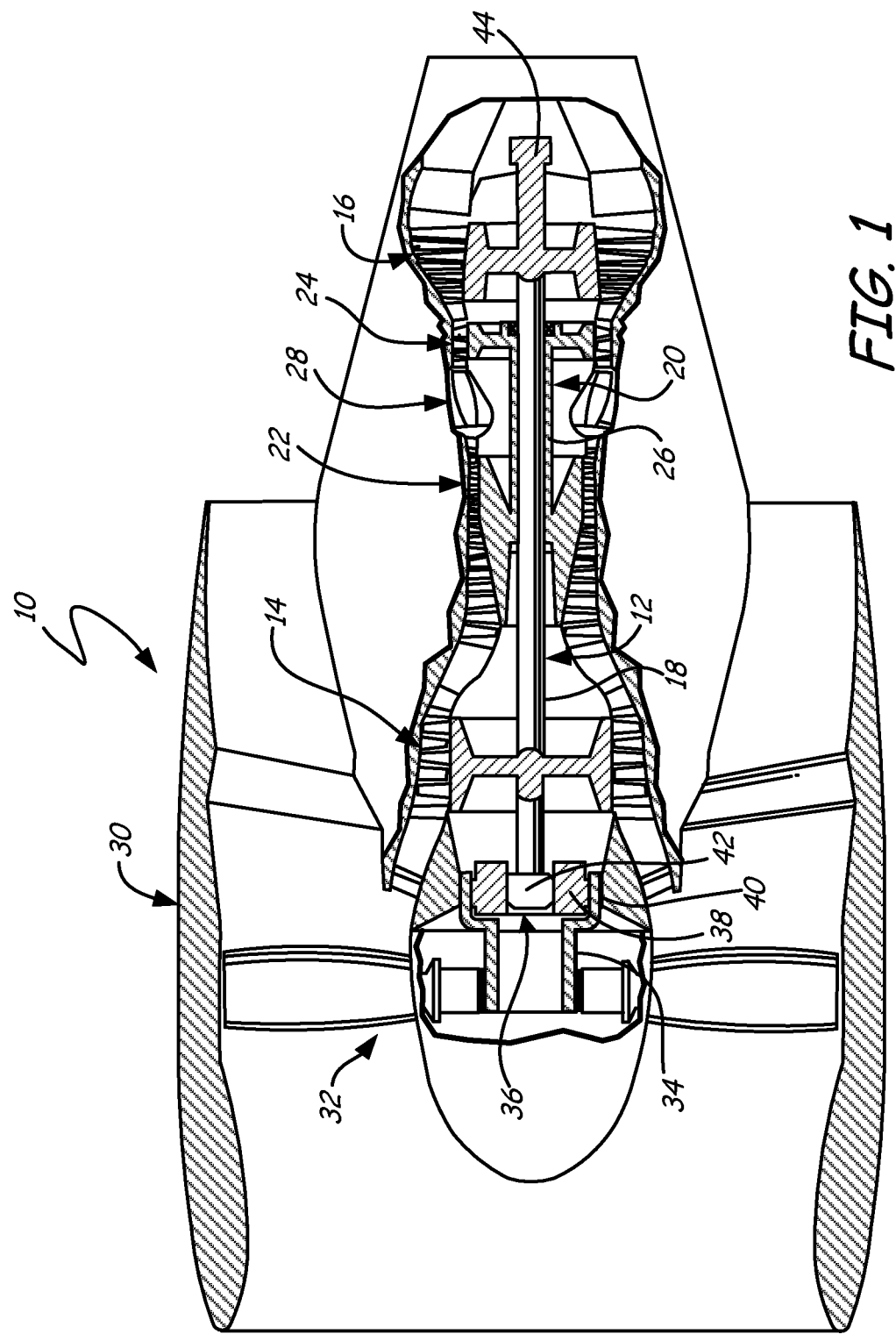
FIG. 1 shows a cross-section of a gas turbine engine.

FIG. 1 includes gas turbine engine 10, low spool 12, low pressure compressor (LPC) 14, low pressure turbine (LPT) 16, low pressure shaft 18, high spool 20, high pressure compressor (HPC) 22, high pressure turbine (HPT) 24, high pressure shaft 26, combustor 28, nacelle 30, propulsion fan 32, fan shaft 34, fan drive gear system 36, ring gear 38, sun gear 40, planetary gear 42, and accessory gearbox 44.

FIG. 1 is a cross-sectional schematic view of gas turbine engine 10, in a two-spool turbofan configuration for use as a propulsion engine. In this particular example, low spool 12 includes low pressure compressor (LPC) 14 and low pressure turbine (LPT) 16, rotationally coupled via low pressure shaft 18. High spool 20 includes high pressure compressor (HPC) 22 and high pressure turbine (HPT) 24, rotationally coupled via high pressure shaft 26. Combustor 28 is arranged in flow series between high pressure compressor 22 and high pressure turbine 24, with low and high spools 12, 20 coaxially oriented about the center of engine 10.

Nacelle 30 is coaxially oriented about the forward end of the power core and surrounding propulsion fan 32. In advanced engines, fan drive gear system 36 couples fan shaft 34 to low spool 12, with respective ring, sun, star and planetary gear mechanisms 38, 40 and 42 providing independent fan speed control for reduced noise and improved operating efficiency. Accessory gearbox 44 is at the turbine end of low spool 12 adjacent power core outlet. Engine 10 is powered by a quantity of fuel, such as Jet/A1, which is burned in combustor 28 to provide motive power. Fuel is contained in one or more tanks apart from engine 10, and transported thereto by at least one fuel line, an example of which is schematically shown in FIGS. 2A-2B.

While described with respect to a turbofan engine driving an aircraft, it will be appreciated that alternative embodiments of the apparatus and method described below can be readily adapted to more accurately measure mass flow rates of fuels for other engines, whether land-based or aircraft-based. This includes engines providing the primary propulsive force, as well as those primarily configured to provide electrical, hydraulic, or other non-motive power. These are in addition to embodiments adapted to measure fluid mass flow rates for many other industrial process feedstocks and fuels as well.

Figure 2A:
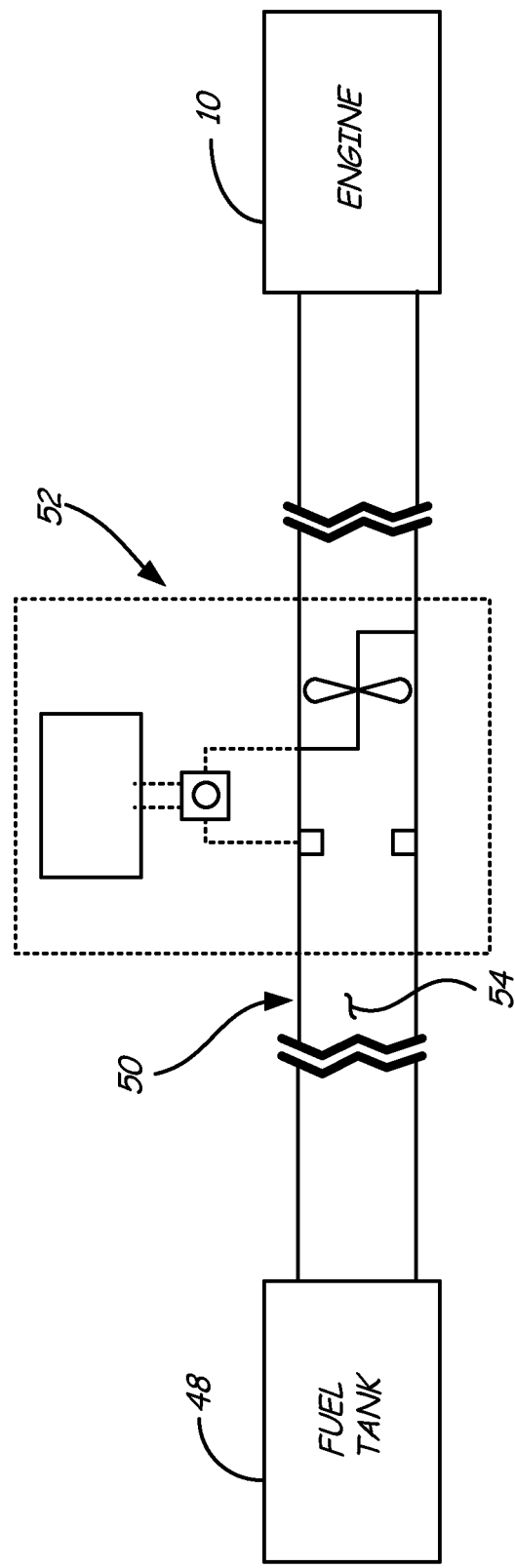
FIG. 2A schematically shows a section of fuel line with a combination fluid mass flow meter.

FIG. 2A shows section 50 of a fuel line running between fuel tank 48 and engine 10. Fuel line section 50 in this example is a main fuel transport line but can alternatively be a smaller branch line feeding only portions of combustor 28. Fuel line 50 includes mass flow meter 52 disposed in line with bore 54 of fuel line 50 to measure the mass flow rate of fuel consumed by engine 10. Mass flow meter 52 includes two different volumetric flow meters in series which communicate with a meter controller as shown in more detail below. As described below, it is important to accurately measure fuel mass flowing to engine 10. Turbine meters are highly accurate volumetrically but have little provision to compensate for fluid density variation. Among many other known uses, fuel line 50 may also optionally pass fuel through a heater, heat exchanger, or other suitable fuel conditioning apparatus (not shown). Fuel may also be used or diverted to operate actuators and cool engine lubricant without affecting operation of meter 52.

Figure 2B:
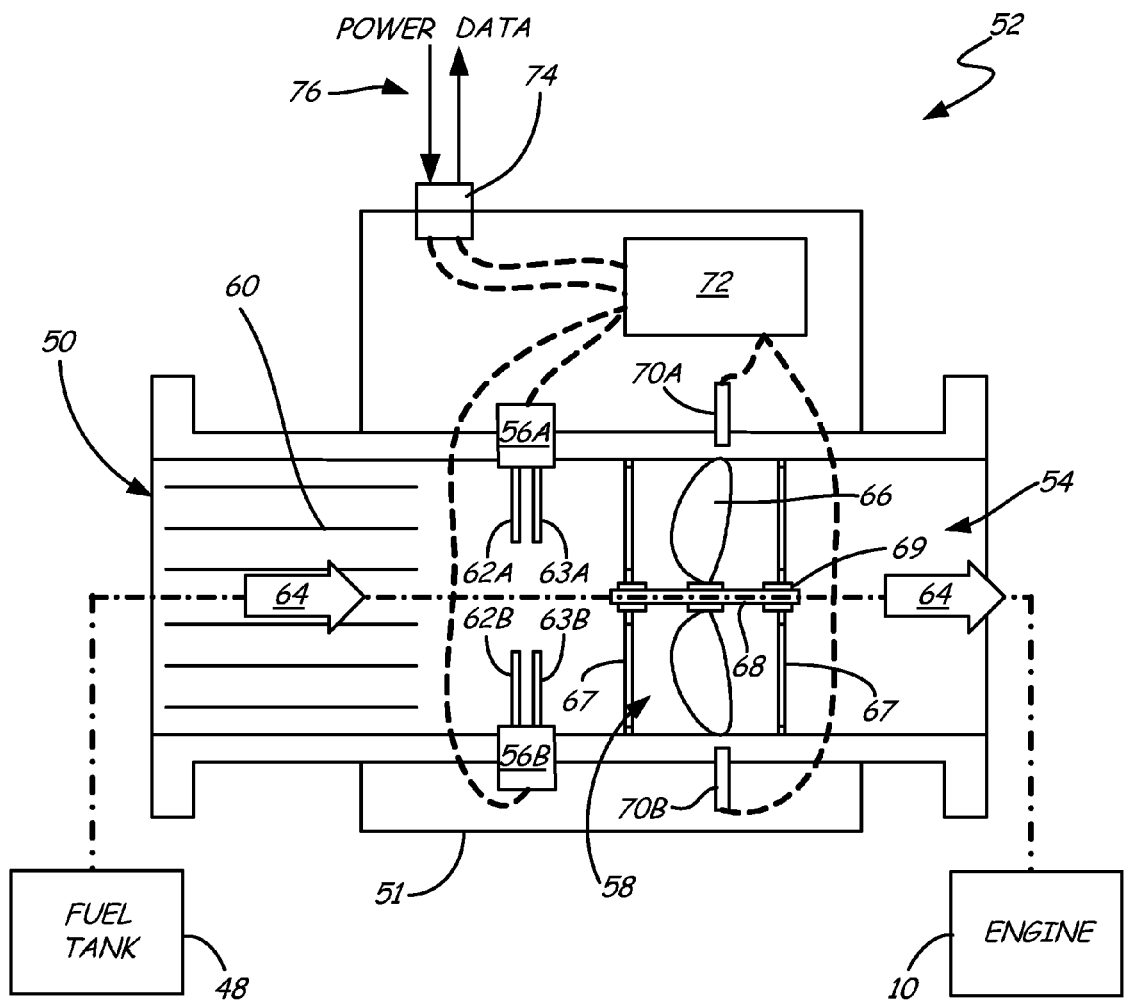
FIG. 2B is a magnified view of the combination fluid mass flow meter.

FIG. 2B is a magnified view of fuel line section 50 with engine 10, fuel tank 48, meter housing 51, combination mass flow meter 52, bore 54, thermal dispersion meters 56A, 56B, volumetric turbine meter 58, flow conditioner 60, fluid temperature sensors 62A, 62B, velocity sensors 63A, 63B, fluid 64, flow turbine 66, shaft supports 67, turbine shaft 68, flow turbine bearings 69, pickups 70A, 70B, processor 72, transmitter 74, and communication bus 76.

Combination mass flow meter 52 is located along housing 51 and includes thermal dispersion meters 56A, 56B disposed upstream of turbine meter 58. Flow conditioner 60 is disposed upstream of thermal dispersion meters 56A, 56B for reducing fluid turbulence and resultant measurement error of combination meter 52. Flow conditioner 60 can be provided as one or more longitudinal fins located immediately adjacent thermal dispersion flow meters 56A, 56B as shown. Flow conditioner 60 can be substituted with structures providing similar function.

Generally, volumetric flow measurements of one or both thermal dispersion meters 56A, 56B are compared to a volumetric measurement from turbine meter 58 to estimate a density of fluid 64. This can then be applied to the more accurate volumetric turbine meter flow measurement to provide a corresponding more accurate real-time mass flow measurement.

Thermal dispersion meters 56A, 56B can be operated in parallel to procure a combined flow measurement, or they can be operated on an alternating basis such that one serves a backup for the other. First and second thermal dispersion flow meters 56A, 56B, in this example, are of the "constant temperature differential" type. Each meter 56A, 56B includes a resistive temperature detector (RTD) secured to opposing sides of housing 51 and extending into bore 54. From this measurement, which is transmitted to processor 72, a corresponding highly accurate volumetric flow can then be determined using the cross-sectional area of bore 54. Immediately downstream of thermal dispersion meters 56A, 56B is turbine flow meter 58, which can be a traditional turbine flow meter with flow turbine 66 configured to rotate around shaft 68, maintained by supports 67 and bearings 69. Pickups 70 can use radio frequency transmissions and reflections off blades of flow turbine 66 to calculate a highly accurate real time volumetric flow of fluid 64.

Operation of thermal dispersion flow meters are well known but will be quickly summarized to provide context for the remainder of the description. Each thermal dispersion meter 56A, 56B includes two RTD's in communication with processor 72. In a basic example, first meter 56A includes fluid temperature sensors 62A, 63A. In the example constant temperature differential type meter 56A, temperature sensor 63A is supplied with excess operating current that maintains a fixed temperature differential ($\Delta T$) above sensor 62A (typically about 0.1 deg C). Sensor 63A convectively sheds a portion of this applied energy into fluid 64 and also measures the heated fluid temperature adjacent thereto. The amount of current required to maintain the artificial differential $\Delta T$ is proportional to the mass flow through the throat area. In this example, combination meter 52 also includes second meter 56B with fluid temperature sensors 62B, 63B. Second meter 56B, operated similarly to meter 56A as described above, can be used in conjunction with meter 56A. Alternatively meter 56B is available to provide system redundancy.

In this case, combination mass flow meter 52 places one or more thermal dispersion meters 56A, 56B in series with turbine meter 58. One or both meters 56A, 56B are in data communication with a controller including at least processor 72 and transmitter 74. Processor 72 is programmed to provide and measure energy quantities $Q_1$ and $Q_2$ used to heat velocity sensors 63A, 63B to a $\Delta T$ above the bulk fluid temperature. Using known size of bore 54, as well as various equations and fluid properties well known in the art of fluid dynamics, processor 72 can then calculate mass and volumetric flow of fluid 64 from one or both energy values $Q_1, Q_2$. Since thermal dispersion rates are proportional to fluid density, volumetric flow measurements from meters 56A, 56B will vary according to changes in density of fluid 64, while volumetric measurements from meter 58 will not. Thus, density can be calculated based on differences between these volumetric measurements and nominal or previously calculated fluid densities.

Processor 72 is programmed to manipulate volumetric flow measurements from the individual meters to more accurately calculate and track real-time mass flow of fluid 64 over widely varying operating conditions. Processor 72, which can be any available modern high temperature processor built to survive highly variable aircraft environments, can supply excitation voltage to thermal dispersion meters 56A, 56B and amplification to RF signals (for pickups 70) as required. Processor 72 also contains the lookup values and equations to convert the energy values $Q_1$ and/or $Q_2$ into flow values for fluids such as Jet/A1. Processor 72 also contains a look up table for calibration of thermal dispersion flow meters 56A, 56B and turbine meter 58. Processor 72 also can include software to track and store these measurements as well as software to continually update the estimated fluid density value as determined below. Exact calculations will vary based on parameters provided in consultation with the manufacturer or reseller of individual meters 56A, 56B, 58, and/or processor 72 because the various coefficients and values required to measure mass and volumetric flows rates depend on factors such as the fluid viscosity, skin resistance and stem conduction of meters 56A, 56B, etc. Processor 72, along with the various sensors, are powered by and communicate flow measurements and other related data with the aircraft monitoring and control systems (not shown) via transmitter 74 and communication bus 76.

In certain embodiments where fuel is provided to one or more FADEC managed engines, processor 72 can include at least one local linearizing erasable programmable read only memory (EPROM) module to store accurate relationships between the frequency/viscosity of fluid 64 versus volume flow for turbine meter(s) 58. It is also possible to use a highly accurate nominal flow profile that is constant for all turbine meters. This would allow the electronic engine controller to be the flow computer, omitting the need for a high temperature data module.

Measured separately, any difference between the volumetric flows of the individual meters is due to 1) the accuracy of the individual meters using a nominal flow value of the fluid and 2) the actual density of the fluid. A thermal dispersion flow meter is subject to error from velocity and thermal dispersion variations depending on the exact depth and sensitivity of the individual RTD(s). Similarly, a volumetric turbine flow meter cannot detect density values to account for fluid composition. Volumetric meters are typically tuned to narrow ranges of density and temperature and thus respond well to variations in flow quality. However, mass flow rates derived solely from such meters can vary widely with changes in flow rates, densities, and temperatures as shown in FIG. 3B. While some allowance can be made for temperature variations, turbine flow meters particularly have no ability to track density changes based on unmeasured variance in fluid composition.

Since thermal dispersion meters 56A, 56B are sensitive to density, differences in actual density of fluid 64 cause an error in volumetric measurements relative to those of turbine meter 58. For instance, if the density of fluid 64 is exactly nominal, then the two calculated flows will be exactly the same. If the density of fluid 64 is below nominal, then the thermal dispersion flow rate will be less than the turbine flow rate.

To take advantage of the relative strengths of each type of meter, processor 72 can therefore be programmed to slightly increase the calculated density used in the thermal dispersion measurement(s) such that it will equal the volumetric measurement taken by turbine meter 58. Similarly if the actual fluid density is higher than the nominal density, processor 72 will slightly decrease the calculated density so that the two volumetric readings are equal. This process of updating density and obtaining a density correction factor ($\Delta\rho$) can be iterative so that via programming of processor 72, the first, previous, or nominal density is subtracted from this quasi density value to determine a density correction factor. The correction factor is subtracted from the first, previous, or nominal density to calculate a second density, which is then applied to the highly accurate volumetric flow to achieve a similarly accurate real-time mass flow. It is understood that the error in thermal dispersion meters are typically greater than the final mass flow readings calculated by combination meter 52. An example of this comparison with respect to Jet/A1 is shown below.

Figure 3A:
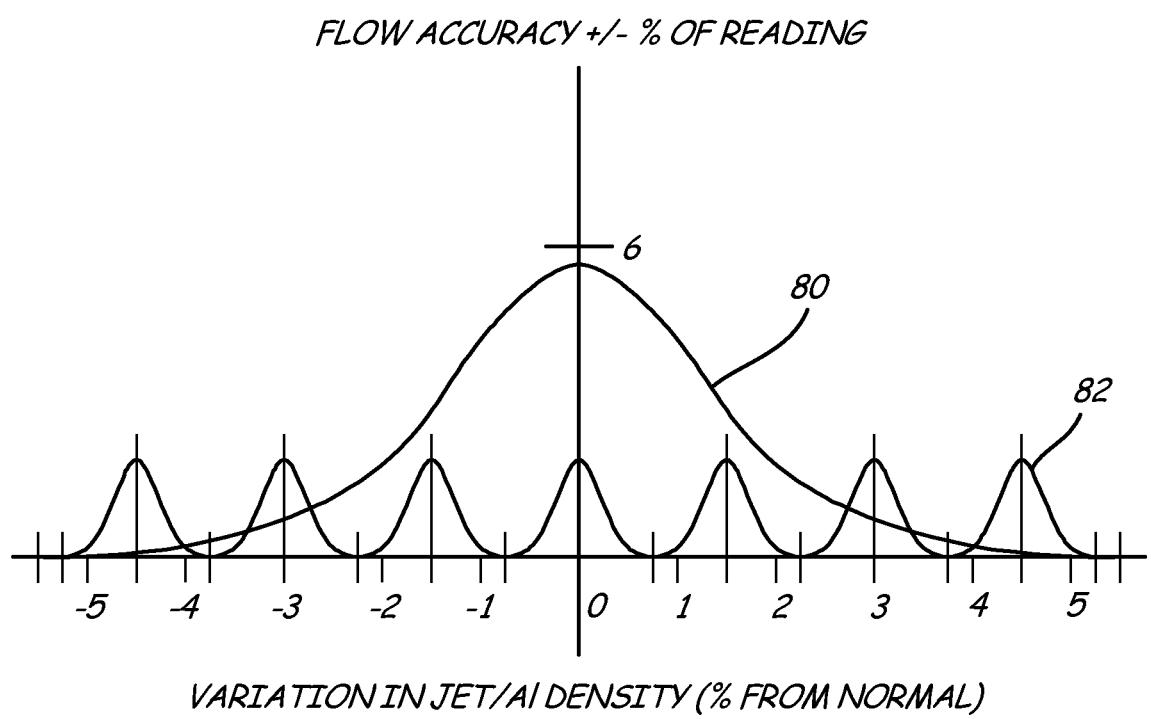
FIG. 3A is a graph comparing estimated measurement error relative to density of the combination mass flow meter to mass flow rate error using a volumetric flow meter.
Figure 3B:
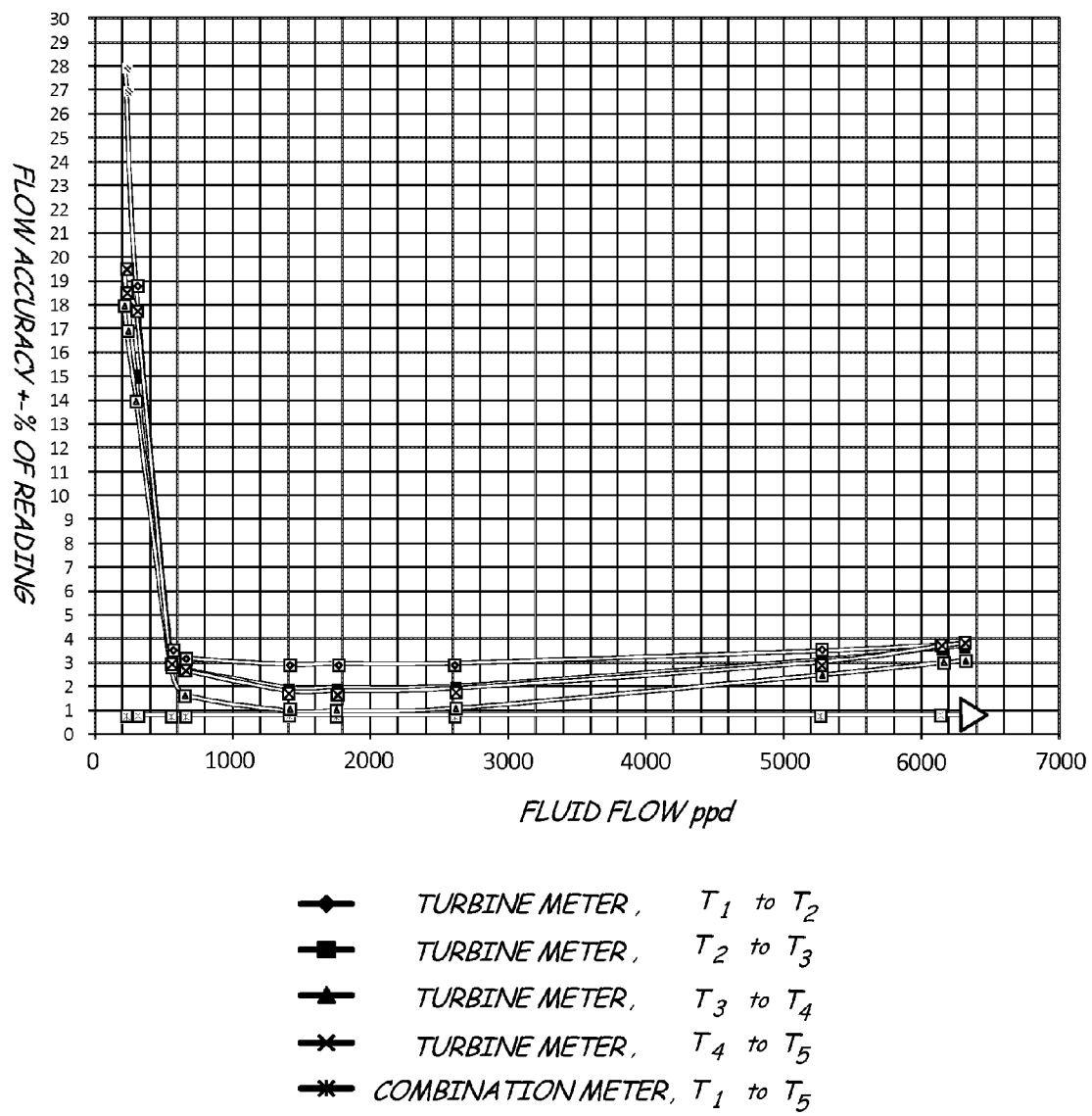
FIG. 3B is a graph showing the calculated error of the combination fluid mass flow meter compared to a volumetric turbine flow meter at different temperature ranges.

FIG. 3A is a graph showing a predicted mass flow accuracy of meter 10 using an example fluid, Jet/A1. Jet/A1 is a worldwide standard for kerosene-based jet fuel. In this example, the nominal density of Jet/A1 at 250° F. (120° C.) is 43.391 lb/ft$^3$ (695 kg/m$^3$). However, fuel classified as Jet/A1 varies significantly in chemical composition, and thus in density (+/− 5.6%), depending on where in the world the original crude is sourced and refined. Density variation is shown along the x-axis. Volumetric flow rates of turbine meters standing alone (e.g. turbine meter 58) are very accurate, typically having volumetric errors on the order of about 0.2% or less. Thus even a "highly accurate" volumetric turbine flow meter alone with a nominal value of Jet/A1 density can still yield a Jet/A1 mass flow error of up to about 6% depending on conditions (shown along the y-axis), shown by curve 80.

Similarly, thermal dispersion meters are less accurate, measuring volume within about 0.75%, assuming minimal density variation. However, Jet/A1 from multiple sources with multiple densities can be mixed in processing, transport, or in fuel tanks. Therefore, actual density (and thus actual mass) of fuel entering the engine at any given time cannot be predicted using either meter alone, especially when using the previously calculated or the original nominal density of the fluid. However, as described below, using both volumetric measurements, a corrected density correction factor can be determined which can then be applied to the existing known or estimated first density, then applied to calculate a more accurate mass flow.

Both the measured thermal dispersion flows and the measured turbine volumetric flows are compared and relied upon to calculate real-time fluid density. One or both of thermal dispersion meters 56A, 56B measures a first thermal dispersion volumetric flow and provides reading(s) to processor 72. At essentially the same time or immediately thereafter, turbine meter 58 measures a second volumetric flow. In this example, assume that the actual density is less than nominal or less than a previously calculated density value. For simplicity, the nominal density will be used here as the first or previously calculated density. Using the nominal density of Jet/A1 (at 250° F. / 120° C.) of 43.391 lb/ft$^3$, one or both active thermal dispersion meters 56A, 56B will falsely indicate a lower volumetric flow as compared to the turbine volumetric flow. Processor 72 is thus programmed to determine a quasi density value by increasing the assumed first density such that it allows the thermal dispersion volumetric flow to equal the higher (and more accurate) volumetric turbine meter flow rate. In this example, a quasi density value of 44.114 lb/ft$^3$ (707 kg/m$^3$), as compared to nominal value of 43.391 lb/ft$^3$, causes calculated thermal dispersion volumetric flow to equal volumetric turbine meter flow. A density correction factor ($\Delta\rho$) is calculated by subtracting a first or nominal density from a quasi density value. This $\Delta\rho$ of 0.723 lb/ft$^3$ (12 kg/m$^3$) is then applied to a previous or nominal density value, meaning that real-time density is calculated as the first or nominal density minus $\Delta\rho$, or: 43.391 lb/ft$^3$−(0.723 lb/ft$^3$)=42.668 lb/ft$^3$ (683 kg/m$^3$) Now that a second corrected density is calculated, it is multiplied by the high accuracy volumetric flow rate of the turbine meter to obtain a mass flow rate in pounds per hour (pph).

Continuing the previous illustrative example, if the actual density of Jet/A1 drops further and is lower than the previously calculated real-time density of 42.668 lb/ft$^3$, the turbine mass flow will continue to read higher than the measured thermal dispersion mass flow. This is because the turbine meter is presumed to be accurately reading the volume but is still using a density that remains too low. Thus processor 72 can be programmed to iteratively repeat the above calculation of $\Delta\rho$ density correction factors by iteratively comparing the measured thermal dispersion volumetric flow rate to the turbine meter volumetric flow rate.

Error of meter 52 is estimated to be the RMS average of each of the turbine and thermal dispersion meters, or: SQRT $(0.2\%^2+0.75\%^2)=0.78\%$. This error is over the entire acceptable range of fluid density as shown by line 82. For reference, this maximum mass flow measurement error using meter 52 is estimated to be about 1/7 (about 0.78% vs. about 5.6%) of the maximum variation in density of Jet/A1, and thus is also about 1/7 of the resulting maximum mass flow measurement error of Jet/A1 measured using only a turbine flow meter.

It should be noted that much of the error in thermal dispersion mass flow readings occurs during temperature transients and density transients where there can be some small lags due to the time constant of the thermal dispersion meters. However, mass flow rate can be iteratively calculated as described above. Over time, error in mass flow readings will stabilize absent rapid changes in conditions. In one embodiment, the nominal density value is replaced in processor 72 with the previous calculated real-time density, which is then used as above to calculate another new density and $\Delta\rho$ density correction factor. In an alternative embodiment, the nominal density is not iteratively updated, and thus the nominal density and $\Delta\rho$ density correction factor are always calculated relative to nominal.

In this example, there are two thermal dispersion meters 56A, 56B, when it will be recognized that only one measurement is required between meters 56A, 56B. A single meter can be provided. More likely, two thermal dispersion meters can be provided for redundancy in the event of failure of one. With at least two meters 56A, 56B, they can therefore be operated together and averaged, or alternatively can be operated in alternating sequence in subsequent engine operations. The choice will depend on accuracy and reliability of other meters, regulatory considerations, as well as the existence and status of other related equipment such as a fuel metering valve. Dual channel RTD sensors of meters 56A, 56B and RF pickups 70 can allow averaging and cross check out of range limiting and redundancy. Turbine meter 58 is shown as single channel, but could be dual channel if required by applications also requiring redundancy.

FIG. 3B is an example showing a comparison of mass flow measurement accuracy of combination meter 52 versus mass flow accuracy of a standard turbine flow meter without density compensation. Here, it can be seen from the error curves that the turbine flow meter error depends significantly on temperature and on flow rate, with separate curves shown for different temperature ranges ($T_1$ to $T_2$, $T_2$ to $T_3$, $T_3$ to $T_4$, and $T_4$ to $T_5$). In this example, $T_1$ is about 32° F. (~0° C.), $T_2$ is about 60° F. (~15° C.), $T_3$ is about 225° F. (~107° F.), $T_4$ is about 275° F. (~135° C.), and $T_5$ is about 300° F. (~145° C.). It can be seen here that for aircraft fuel Jet/A1, turbine flow meters are typically tuned and calibrated to minimize error under cruise conditions with medium flow rates (x-axis) and temperatures, as well as the estimated or nominal density. Mass flow measurement error is minimized in this example with fuel temperature between $T_3$ and $T_4$ and flow rates around 1500 to 1800 pounds per hour (pph). Outside this narrow range, mass flow measurement error becomes much more pronounced. It is also problematic under flight conditions where one or more factors deviate significantly from the expected conditions.

In comparison, combination meter 52 has substantially constant mass flow measurement error across virtually all temperatures (from $T_1$ to $T_5$) and all possible flow rates, up to about 12000 pph. This is because meter 52 takes advantage of the highly accurate volumetric flow measurement of turbine meters, combining these measurements with continually updated real-time density compensation, which is provided by the programmed processor 72 and thermal dispersion meters 56A, 56B configured to calculate and correct fluid density.

At a minimum, combination mass flow meter 52 can replace present torque angle mass flow devices used in most modern aircraft turbine engines. Meter 52 allows for more accurate monitoring of fuel consumption, which can be used to validate the wing tank fuel gauges, monitor engine efficiency, as well as for prognostics. A further application of meter 52 can be to implement primary closed loop control of the engine fuel supply. This can improve the fuel delivery accuracy from about 6% of reading to below 1% of the reading (as shown in FIG. 3A), allowing engineers and designers to take the accuracy burden off of the metering fuel valve system currently used on aircraft. The metering valve system could stay in place as a backup or eventually be eliminated in certain designs.

Figure 4:
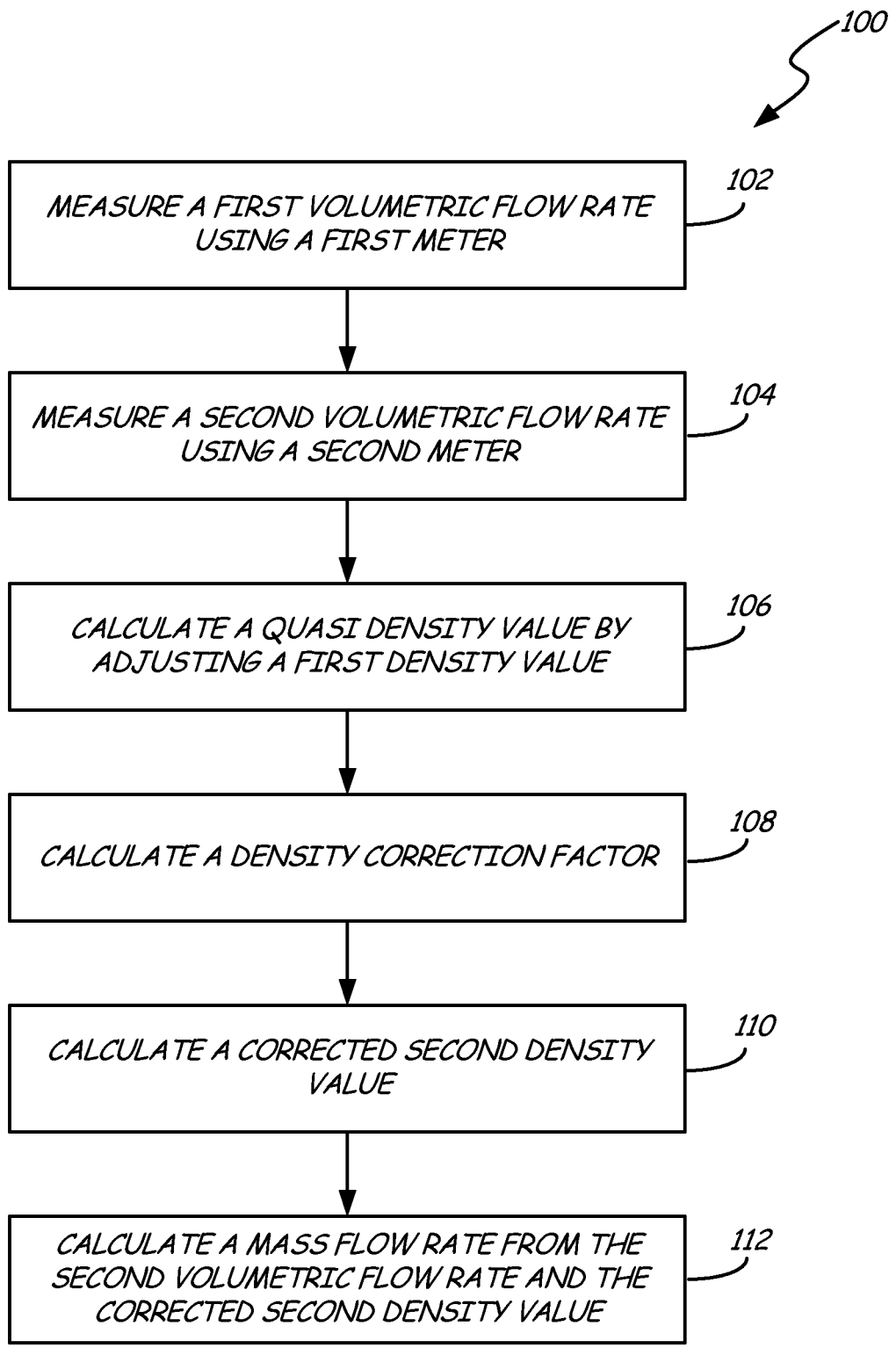
FIG. 4 is a flow chart depicting the steps of calculating a fluid mass flow rate.

FIG. 4 is a flow chart showing method 100 for determining a fluid mass flow rate. At step 102, a first volumetric flow rate is measured using at least one first meter. This meter can be one or both of thermal dispersion meters 56A, 56B or other meters sensitive to density that are also suitable for measuring volumetric flow. Step 104 includes measuring a second volumetric fluid flow using at least one second meter. This can be done, for example, with turbine meter 58 shown in FIG. 2B, or any other highly accurate volumetric flow meter. At step 106, a quasi density value can be calculated by adjusting a first or nominal density to cause the first volumetric flow rate to equal the second volumetric flow rate. Then at step 108, a delta density correction factor ($\Delta\rho$) is calculated by subtracting the first or nominal density value from the quasi density value. At step 110, the density correction factor is subtracted from the first density value to determine a corrected second density value. Per step 112, the corrected second density value can be applied to the second volumetric flow rate to calculate a mass flow rate.

As noted in the preceding paragraph, the quasi density value is determined by adjusting the first density relative to the first volumetric flow rate because the measured volumetric rate taken by the second meter is known to be more accurate. If the density correction factor was instead determined by adjusting the first density relative to the second volumetric flow rate, this would lead to a less accurate mass flow measurement because the first meter (e.g., at least one thermal dispersion meter), is known not to be as accurate at measuring volumetric flow. However, by iteratively correcting the calculated density in this manner, one can take advantage of the strengths of each meter to reduce mass flow measurement error.

This process can be iteratively applied throughout flight to continually determine a corrected mass flow rate using the real-time corrected second density calculations applied to the volumetric measurements of the flow meter. A processor, such as processor 72 described above, can also be programmed to retain, modify, and track changes in the meter readings and calculations to determine a highly accurate fuel burn profile as well as a cumulative profile. Also as noted above, the nominal density value can be used throughout the process or can be iteratively updated after calculation of one or more second corrected density values.

Though described using the illustrative examples of Jet/A1 fuel for aircraft engines, it will be appreciated that the above examples can be adapted to a wide variety of applications, particularly but not exclusively in applications requiring real-time density compensation. For example, many industrial and automotive uses may be readily considered for suitable adaptation of the concepts described herein.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A meter controller comprising:
a first input configured to receive a thermal dispersion flow measurement from a corresponding thermal dispersion flow meter, the thermal dispersion flow measurement including at least one thermal energy value;
a second input configured to receive a turbine meter flow measurement from a corresponding turbine flow meter in series with the thermal dispersion flow meter, the turbine meter flow measurement including at least one volumetric flow rate measurement; and
a processor configured to receive the thermal dispersion flow measurement and the turbine meter flow measurement, calculate a first volumetric flow rate based on the thermal dispersion flow measurement and an initial fluid density value, directly calculate a second volumetric flow rate based on the turbine meter flow rate measurement, and calculate a quasi fluid density value required to cause the first volumetric flow measurement to equal the second volumetric flow measurement, the processor further configured to subtract the initial density value from the quasi fluid density value for calculating a density correction factor ($\Delta\rho$);
wherein the density correction factor ($\Delta\rho$) is subtracted from the initial fluid density value to calculate a corrected density value, the corrected density value applied to the second volumetric flow measurement for calculating a mass flow rate measurement based on the turbine meter flow measurement.

2. The meter controller of claim 1, wherein the initial fluid density value is a nominal fluid density.

3. The meter controller of claim 1, wherein the processor is programmed to iteratively update the initial fluid density value with the corrected second density value.

4. The meter controller of claim 1, wherein the at least one thermal dispersion flow meter is of a constant temperature differential type.

5. A fluid mass flow meter comprising:
at least one thermal dispersion flow meter configured to provide data for a thermal dispersion flow measurement which includes at least one thermal energy value;
a turbine flow meter in series with the thermal dispersion flow meter, the turbine flow meter configured to provide data for a turbine meter flow measurement which includes at least one volumetric flow rate measurement; and
a meter controller in communication with the thermal dispersion flow meter and the turbine flow meter, the meter controller having at least one processor configured to receive the thermal dispersion flow measurement and the turbine meter flow measurement, the at least one processor further configured to calculate a first volumetric flow rate based on the thermal dispersion flow measurement and an initial fluid density value, directly calculate a second volumetric flow rate based on the turbine meter flow measurement, and calculate a quasi fluid density value required to cause the first volumetric flow rate to equal the second volumetric flow rate;
wherein the initial fluid density value is subtracted from the quasi fluid density value to calculate a density correction factor ($\Delta\rho$), the density correction factor is then subtracted from the initial fluid density value to calculate a corrected density value, the corrected density value applied to the second volumetric flow rate for calculating a mass flow rate based on the turbine meter flow measurement.

6. The meter of claim 5, wherein the initial fluid density value is a nominal density value of the fluid.

7. The meter of claim 5, wherein the processor is programmed to iteratively update the initial fluid density value with the corrected density value.

8. The meter of claim 5, wherein the at least one thermal dispersion flow meter is of a constant temperature differential type.

9. The meter of claim 5, wherein the at least one thermal dispersion meter is a plurality of thermal dispersion flow meters operated in parallel.

10. An aircraft fuel system comprising:
a fuel storage tank;
a fuel line leading from the fuel storage tank to an engine; and
a mass flow meter as recited in claim 5, the mass flow meter disposed along the fuel line between the fuel storage tank and the engine.

11. The system of claim 10, wherein the at least one processor is configured to iteratively update the initial fluid density value with the corrected density value.

12. The system of claim 10, wherein the initial fluid density is a nominal density of the fluid.

13. A method of measuring a mass flow rate of a fluid, the method comprising:
measuring a first volumetric flow rate using at least one thermal dispersion flow meter configured to provide data for a thermal dispersion flow measurement which includes at least one thermal energy value;
measuring a second volumetric flow rate using at least one turbine flow meter in series with the thermal dispersion flow meter, the turbine flow meter configured to provide data for a turbine meter flow measurement which includes at least one volumetric flow rate measurement;
calculating a quasi density value by adjusting an initial fluid density value such that the first volumetric flow rate equals the second volumetric flow rate;
calculating a density correction factor ($\Delta\rho$) by subtracting the initial fluid density from the quasi density value;
calculating a corrected density value by subtracting the density correction factor ($\Delta\rho$) from the initial fluid density; and
applying the corrected density value to the second volumetric flow rates to calculate a mass flow rate.

14. The method of claim 13, further comprising:
replacing the initial density value with the corrected density value.

15. The method of claim 13, wherein the method steps are iteratively performed to iteratively calculate a series of corrected density values, and a series of mass flow rates based corresponding ones of a series of second volumetric flow measurements.

16. The method of claim 13, wherein the method is performed in a fuel system for an aircraft.

* * * * *